United States Patent
Masuda et al.

(10) Patent No.: US 11,891,715 B2
(45) Date of Patent: Feb. 6, 2024

(54) PADDLE, PROCESSING APPARATUS HAVING THE PADDLE, AND METHOD OF PRODUCING THE PADDLE

(71) Applicant: EBARA CORPORATION, Tokyo (JP)

(72) Inventors: Yasuyuki Masuda, Tokyo (JP); Shao Hua Chang, Tokyo (JP); Yoshitaka Mukaiyama, Tokyo (JP); Masashi Shimoyama, Tokyo (JP); Jumpei Fujikata, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 166 days.

(21) Appl. No.: 17/177,500

(22) Filed: Feb. 17, 2021

(65) Prior Publication Data

US 2021/0262111 A1 Aug. 26, 2021

(30) Foreign Application Priority Data

Feb. 20, 2020 (JP) .................................. 2020-027004

(51) Int. Cl.
| | | |
|---|---|---|
| *C25D 17/02* | (2006.01) | |
| *C25D 21/10* | (2006.01) | |
| *B33Y 80/00* | (2015.01) | |
| *B33Y 50/02* | (2015.01) | |
| *B33Y 10/00* | (2015.01) | |

(52) U.S. Cl.
CPC .............. *C25D 21/10* (2013.01); *B33Y 10/00* (2014.12); *B33Y 50/02* (2014.12); *B33Y 80/00* (2014.12); *C25D 17/02* (2013.01)

(58) Field of Classification Search
None
See application file for complete search history.

(56) References Cited

U.S. PATENT DOCUMENTS 8,440,065 B1    5/2013   Hradil et al.
2019/0309435 A1* 10/2019   Okuda .................. C25D 21/10

FOREIGN PATENT DOCUMENTS

| CN | 1632213 A | 6/2005 | |
| CN | 208857381 | * 5/2019 | ............ C25D 17/00 |
| JP | 2000-129496 A | 5/2000 | |
| JP | 2012-126966 A | 7/2012 | |
| WO | WO 2017/130469 A1 | 8/2017 | |

OTHER PUBLICATIONS

English translation CN 103695972, Akifumi et al., Apr. 2, 2014. (Year: 2014).*
English translation CN 202347111. (Year: 2012).*

* cited by examiner

*Primary Examiner* — Stefanie S Wittenberg
(74) *Attorney, Agent, or Firm* — BakerHostetler

(57) ABSTRACT

A paddle capable of reducing an influence of blocking the electric field and capable of improving its mechanical strength is disclosed. The paddle, which is configured to agitate a processing liquid in a processing tank by moving in the processing tank, includes a plurality of agitating beams that form a honeycomb structure. The honeycomb structure has a plurality of hexagonal through-holes formed by the plurality of agitating beams.

13 Claims, 17 Drawing Sheets

DIRECTION OF RECIPROCATING MOTION OF PADDLE

FIG. 7

|  | CONVENTIONAL PADDLE | HONEYCOMB PADDLE No.1 | HONEYCOMB PADDLE No.2 | HONEYCOMB PADDLE No.3 |
|---|---|---|---|---|
| WIDTH OF AGITATING BEAMS | 3mm | 1.5mm | 1.0mm | 0.5mm |
| ARRANGEMENT PITCH OF AGITATING BEAMS | 23mm | 23mm | 13.5mm | 8mm |
| DENSITY OF AGITATING BEAMS | 13.0% | 6.52% | 7.41% | 6.25% |
| MECHANICAL STRENGTH | 1 | 2.8 | 3.4 | 3.8 |
| ELECTRIC-FIELD BLOCKING RATE | 1 | 0.43 | 0.28 | 0.15 |

FIG. 8

| ARRANGEMENT PITCH OF HEXAGONAL THROUGH-HOLES | 23mm | 13.5mm | 8mm | 5mm |
|---|---|---|---|---|
| AGITATING INTENSITY (AVERAGE FLOW VELOCITY) | 1 | 1.19 | 1.29 | 1.26 |

DIRECTION OF RECIPROCATING MOTION OF PADDLE

H : HEIGHT OF HEXAGONAL THROUGH-HOLE
T : STROKE LENGTH OF PADDLE
n : NATURAL NUMBER

PRIOR ART

*PRIOR ART*

PADDLE, PROCESSING APPARATUS HAVING THE PADDLE, AND METHOD OF PRODUCING THE PADDLE

CROSS REFERENCE TO RELATED APPLICATION

This document claims priority to Japanese Patent Application Number 2020-027004 filed Feb. 20, 2020, the entire contents of which are hereby incorporated by reference.

BACKGROUND

FIG. 18 is a schematic view showing a conventional plating apparatus. As shown in FIG. 18, the plating apparatus, which is an example of a processing apparatus for processing a workpiece W, includes a plating tank 201 configured to hold a plating solution therein, an anode 202 arranged in the plating tank 201, an anode holder 203 holding the anode 202, and a workpiece holder 204. The workpiece holder 204 is configured to removably hold the workpiece W, such as a wafer or a substrate, and to immerse the workpiece W in the plating solution in the plating tank 201.

The plating apparatus further includes a paddle 205 for agitating the plating solution in the plating tank 201. The paddle 205 is located near a surface of the workpiece W held by the workpiece holder 204. The paddle 205 is vertically arranged and reciprocates in parallel with the surface of the workpiece W to agitate the plating solution, so that sufficient metal ions can be uniformly distributed to the surface of the workpiece W during the plating of the workpiece W.

The anode 202 is coupled to a positive electrode of a power supply 207 via the anode holder 203, while the workpiece W is coupled to a negative electrode of the power supply 207 via the workpiece holder 204. When a voltage is applied between the anode 202 and the workpiece W, an electric current flows through the workpiece W, so that a metal film is formed on the surface of the workpiece W.

The thickness of the metal film formed on the workpiece W by plating is affected by a strength of an electric field formed between the anode 202 and the workpiece W. Since the paddle 205 is arranged between the anode 202 and the workpiece W, the paddle 205 blocks the electric field while reciprocating in the horizontal direction.

FIG. 19 is a view of the paddle 205 shown in FIG. 18 as viewed from a direction indicated by arrow A. The paddle 205 includes a plurality of agitating rods 208 extending in the vertical direction. These agitating rods 208 agitate the plating solution while reciprocating in directions indicated by arrows in FIG. 19. In order to reduce the influence of the blocking the electric field, it is desirable that a width of each agitating rod 208 be as small as possible.

However, reducing the width of the agitating rod 208 entails a lowered mechanical strength of the paddle 205. As a result, the agitating speed of the paddle 205 cannot be increased. On the other hand, if the width of the agitating rod 208 is increased, the mechanical strength of the paddle 205 is improved, but the influence of the blocking the electric field is increased. As a result, a thickness of a metal film formed on the workpiece W becomes non-uniform.

SUMMARY OF THE INVENTION

Therefore, there is provided a paddle capable of reducing an influence of blocking an electric field and capable of improving a mechanical strength of the paddle. There is also provided a processing apparatus having such a paddle.

Embodiments, which will be described below, relate to a paddle for use in processing a surface of a workpiece, such as a wafer, a substrate, a panel, etc., and further relate to a processing apparatus having the paddle, and a method of manufacturing the paddle.

In an embodiment, there is provided a paddle for agitating a processing liquid in a processing tank by moving in the processing tank, comprising: a plurality of agitating beams that form a honeycomb structure, the honeycomb structure having a plurality of hexagonal through-holes formed by the plurality of agitating beams.

In an embodiment, each of the plurality of agitating beams is inclined with respect to a moving direction of the paddle or perpendicular to the moving direction of the paddle.

In an embodiment, the plurality of hexagonal through-holes comprise a plurality of regular hexagonal through-holes.

In an embodiment, a percentage of a width of the plurality of agitating beams to an arrangement pitch of the plurality of hexagonal through-holes is less than 10%.

In an embodiment, a width of the plurality of agitating beams is in a range of 0.5 mm to 3.0 mm.

In an embodiment, an arrangement pitch of the plurality of hexagonal through-holes is in a range of 5 mm to 23 mm.

In an embodiment, an arrangement direction of the plurality of hexagonal through-holes is inclined with respect to a moving direction of the paddle.

In an embodiment, the movement of the paddle is a reciprocating motion of the paddle; and $\tan\theta$ is equal to $n(H/2)/T$, where $\theta$ represents an angle of the arrangement direction of the hexagonal through-holes with respect to the direction of the reciprocating motion of the paddle, T represents a length of one stroke of the reciprocating motion of the paddle, H represents a height of each hexagonal through-hole, and n represents a natural number.

In an embodiment, there is provided a processing apparatus for processing a workpiece, comprising: a processing tank for holding a processing liquid therein; a workpiece holder configured to hold the workpiece, a paddle configured to agitate the processing liquid in the processing tank, paddle being disposed in the processing tank; and a paddle-driving device configured to move the paddle, wherein the paddle comprises a plurality of agitating beams that form a honeycomb structure, the honeycomb structure having a plurality of hexagonal through-holes formed by the plurality of agitating beams.

In an embodiment, there is provided a method of manufacturing a paddle for agitating a processing liquid in a processing tank by moving in the processing tank, comprising: storing a three-dimensional design data for the paddle in a memory of a three-dimensional printing machine; and producing the paddle based on the three-dimensional design data, wherein the paddle comprises a plurality of agitating beams that form a honeycomb structure, the honeycomb structure having a plurality of hexagonal through-holes formed by the plurality of agitating beams.

The paddle having the honeycomb structure can achieve both a high mechanical strength and a low electric-field blocking rate.

BRIEF DESCRIPTION OF THE DRAWINGS

FIG. 7 is a table showing specific configuration examples and performances of paddles according to embodiments and a conventional paddle shown in FIG. 19;

FIG. 8 is a table showing a relationship between arrangement pitch of hexagonal through-holes and agitating intensity of the paddle;

DESCRIPTION OF EMBODIMENTS

Embodiments will be described below with reference to the drawings.

Figure 1:
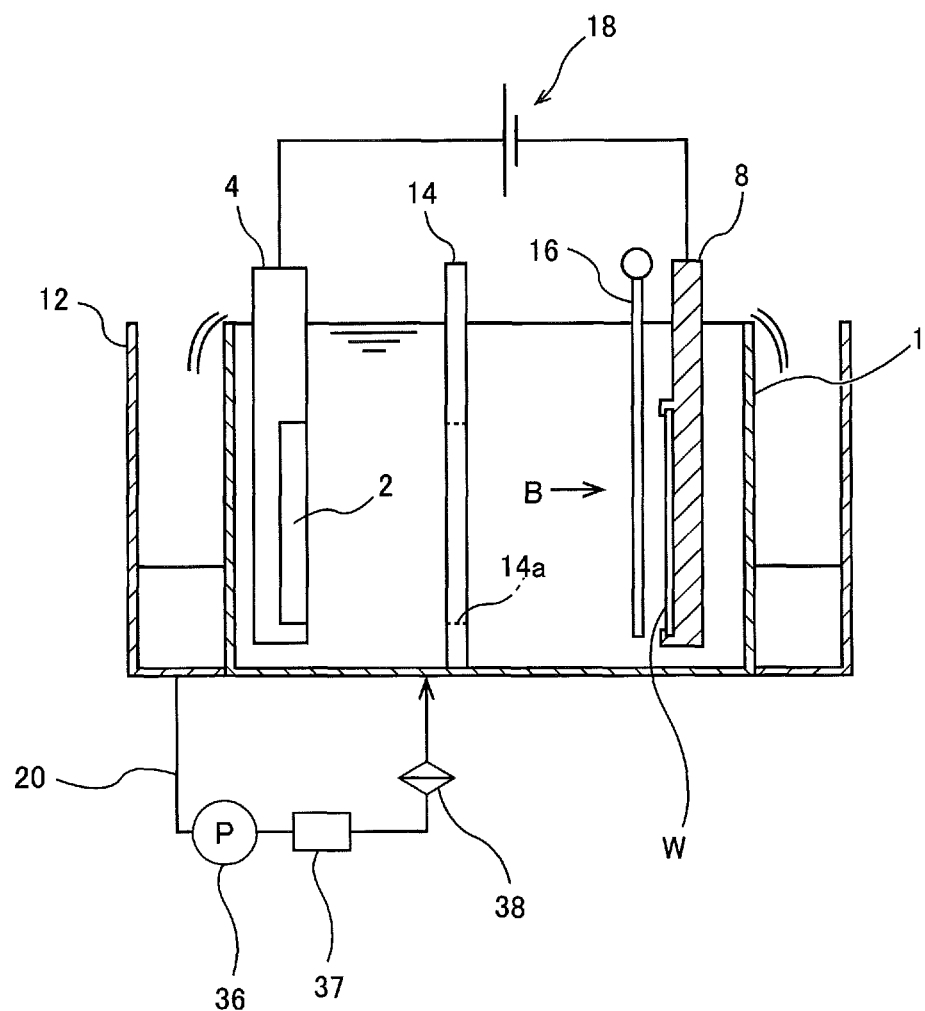
FIG. 1 is a schematic view showing an embodiment of a plating apparatus which is an example of a processing apparatus.

FIG. 1 is a schematic view showing an embodiment of a plating apparatus which is an example of a processing apparatus. As shown in FIG. 1, the plating apparatus, which is an example of a processing apparatus for processing a workpiece, includes a plating tank (or a processing tank) 1 for holding a plating solution (or a processing liquid) therein, an anode 2 disposed in the plating tank 1, an anode holder 4 holding the anode 2, and a workpiece holder (or a holding device) 8 arranged in the plating tank 1. The workpiece holder 8 is configured to removably hold a workpiece W (e.g., a wafer, a substrate, or a panel) and to immerse the workpiece W in the plating solution held in the plating tank 1. The plating apparatus according to the present embodiment is an electrolytic plating apparatus that is configured to plate a surface of the workpiece W with metal by passing an electric current through the plating solution. The metal plated on the surface of the workpiece W is, for example, copper (Cu), nickel (Ni), tin (Sn), Sn—Ag alloy, cobalt (Co), or gold (Au).

The anode 2 and the workpiece W are arranged vertically and face each other in the plating solution. The anode 2 is coupled to a positive electrode of a power supply 18 via the anode holder 4, and the workpiece W is coupled to a negative electrode of the power supply 18 via the workpiece holder 8. When a voltage is applied between the anode 2 and the workpiece W, the current flows through the workpiece W, so that a metal film is formed on the surface of the workpiece W.

The plating apparatus includes an overflow tank 12 located next to the plating tank 1. The plating solution in the plating tank 1 overflows a side wall of the plating tank 1 and flows into the overflow tank 12. One end of a plating-solution circulation line 20 is coupled to a bottom of the overflow tank 12, and other end of the plating-solution circulation line 20 is coupled to a bottom of the plating tank 1. A circulation pump 36, a thermostat 37, and a filter 38 are attached to the plating-solution circulation line 20.

The plating solution overflows the side wall of the plating tank 1 into the overflow tank 12, and is further returned from the overflow tank 12 to the plating tank 1 through the plating-solution circulation line 20. In this way, the plating solution circulates between the plating tank 1 and the overflow tank 12 through the plating-solution circulation line 20.

The plating apparatus further includes a regulation plate 14 for regulating a potential distribution on the workpiece W, and a paddle 16 for agitating the plating solution in the plating tank 1. The regulation plate 14 is located between the paddle 16 and the anode 2 and has an opening 14a for regulating an electric field in the plating solution. The paddle 16 is located near the surface of the workpiece W held by the workpiece holder 8 in the plating tank 1. A distance between the surface of the workpiece W and the paddle 16 is within a range of 3 mm to 15 mm. The distance between the surface of the workpiece W and the paddle 16 is preferably 10 mm or less, more preferably 8 mm or less. The paddle 16 is vertically disposed and reciprocates in parallel with the surface of the workpiece W to agitate the plating solution, so that sufficient metal ions can be uniformly distributed on the surface of the workpiece W during the plating of the workpiece W.

Figure 2:
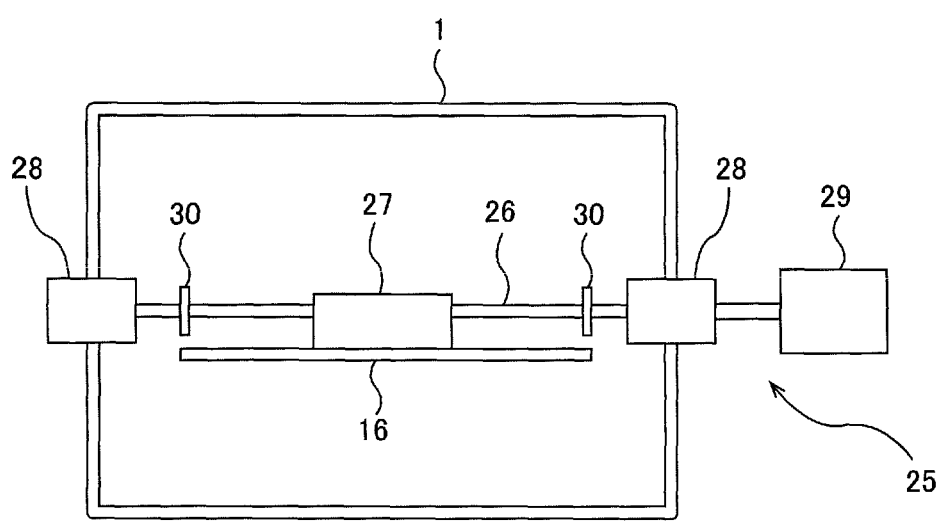
FIG. 2 is a plan view showing a reciprocating mechanism for causing a paddle to reciprocate in a plating tank.
Figure 3A:
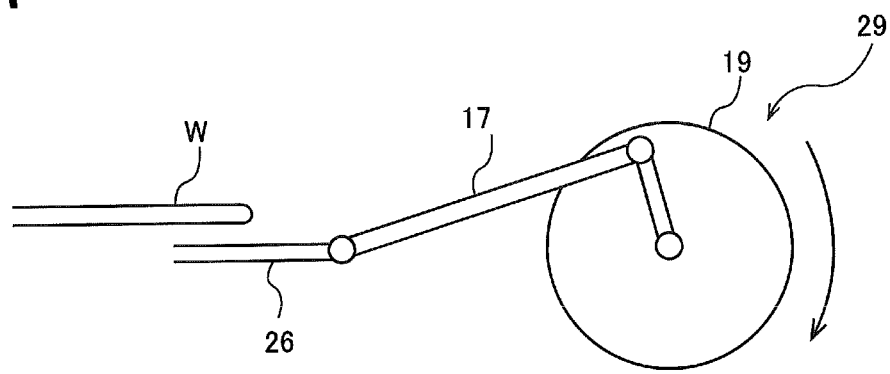
FIGS. 3A to 3D are schematic views each showing a paddle-driving device shown in FIG. 2.
Figure 3B:
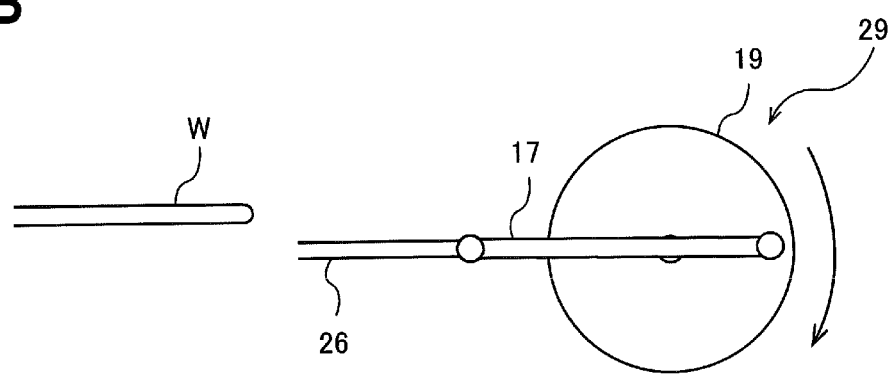
Figure 3C:
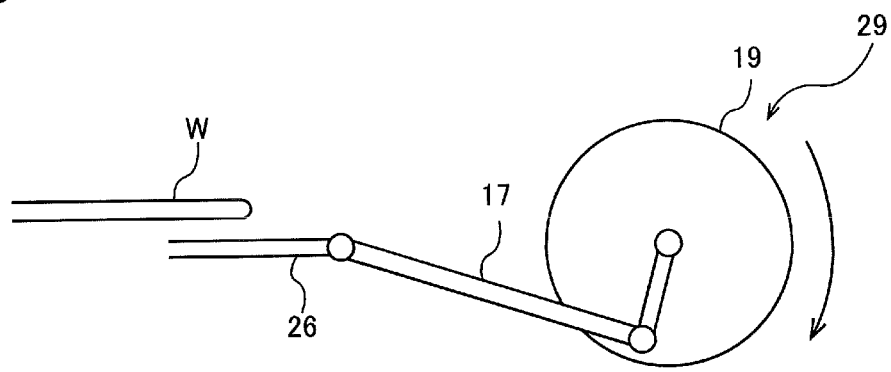
Figure 3D:
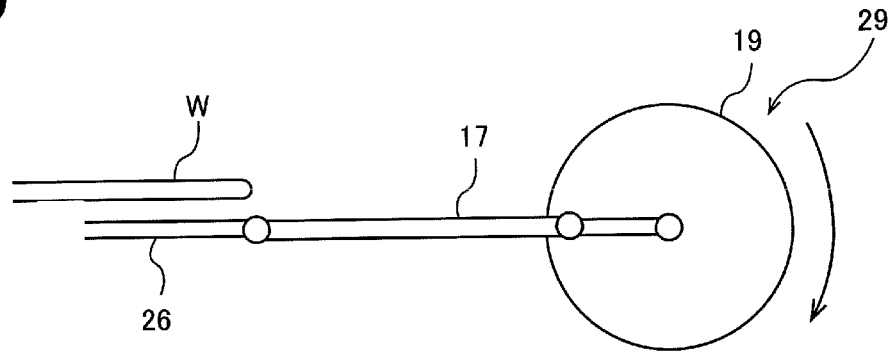

FIG. 2 is a top view showing a reciprocating mechanism 25 for reciprocating the paddle 16 in the plating tank 1. The reciprocating mechanism 25 includes a shaft 26 extending in a horizontal direction, a paddle holder 27 fixed to the shaft 26, shaft supporting members 28 that support the shaft 26 movably in its longitudinal direction, and a paddle-driving device 29 configured to reciprocate the shaft 26 and the paddle 16 integrally. The paddle 16 is held by the paddle holder 27. The shaft 26 has flange portions 30 located at both sides of the paddle holder 27. These flange portions 30 prevent the plating solution from moving along the shaft 26 and reaching the shaft supporting members 28.

FIGS. 3A to 3D are schematic views each showing the paddle-driving device 29 shown in FIG. 2. The shaft 26 is coupled to a crank disk 19 via a connecting rod 17. The connecting rod 17 is eccentrically attached to the crank disk 19. The crank disk 19 is coupled to an electric motor (not shown). When the electric motor rotates the crank disk 19 in a direction indicated by arrow, the rotation of the crank disk 19 is converted into a reciprocating motion by the connecting rod 17, so that the shaft 26, coupled to the connecting rod 17, reciprocates. The paddle 16, which is coupled to the shaft 26, reciprocates in parallel with the surface of the workpiece W by the paddle-driving device 29 to agitate the plating solution near the surface of the workpiece W.

In the present embodiment, the paddle reciprocates in the horizontal direction, while in one embodiment, the paddle may reciprocate in a direction inclined with respect to the horizontal direction, or may reciprocate in the vertical direction.

The paddle 16 is arranged so as to move across the electric field formed between the anode 2 and the workpiece W. Therefore, the electric field is blocked by the paddle 16, which can affect uniformity of a film thickness. In particular, when the reciprocating paddle 16 is located at its stroke end, the speed of the paddle 16 becomes zero. Therefore, a dwelling time of the paddle 16 at the stroke end is specifically longer than that at other places. Such movement of the paddle 16 may lower the uniformity of the film thickness. Therefore, in the present embodiment, as will be described below, the paddle 16 has a structure capable of reducing the influence of blocking the electric field and improving a mechanical strength of the paddle 16.

Figure 4:
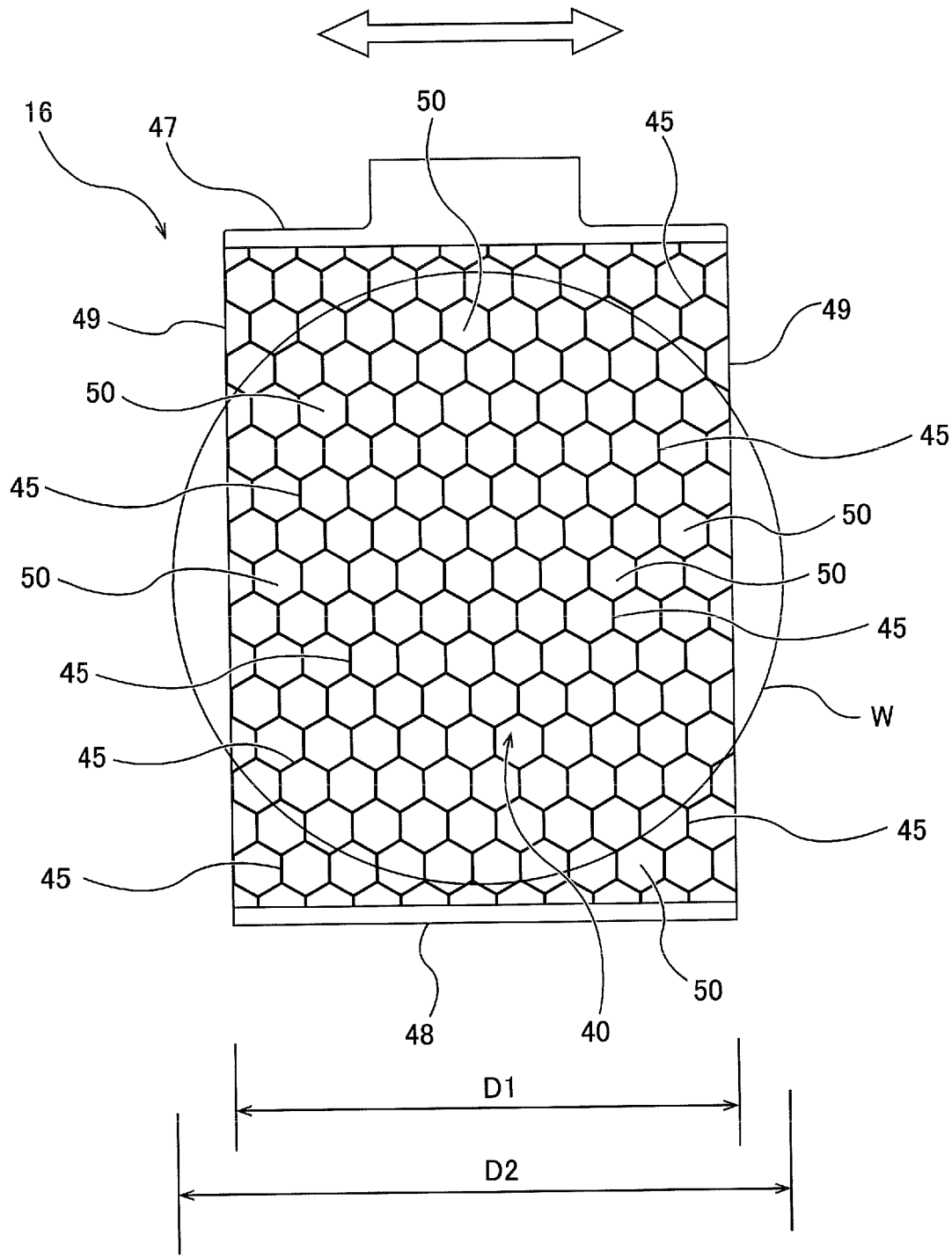
FIG. 4 is a view of the paddle shown in FIG. 1 as viewed from a direction indicated by arrow B.

FIG. 4 is a view of the paddle 16 shown in FIG. 1 as viewed from a direction indicated by arrow B. The paddle 16 includes a plurality of agitating beams 45 forming a honeycomb structure 40, an upper frame 47 coupled to an uppermost end of the honeycomb structure 40, a lower frame 48 coupled to a lowermost end of the honeycomb structure 40, and side frames 49 coupled to both sides of the honeycomb structure 40. The upper frame 47 is coupled to uppermost agitating beams 45 of the plurality of agitating beams 45, and the lower frame 48 is coupled to lowermost agitating beams 45 of the plurality of agitating beams 45. The side frames 49 extend from the upper frame 47 to the lower frame 48. The upper frame 47 is held by the paddle holder 27 shown in FIG. 2. One or both of the side frames 49 and the lower frame 48 may be omitted.

The honeycomb structure 40 has a plurality of hexagonal through-holes 50 formed by the agitating beams 45. These hexagonal through-holes 50 are arranged side by side in the horizontal direction without any gaps therebetween. That is, the hexagonal through-holes 50 are arranged parallel to the direction of the reciprocating motion of the paddle 16. The hexagonal through-holes 50 have the same shape and size.

Figure 5:
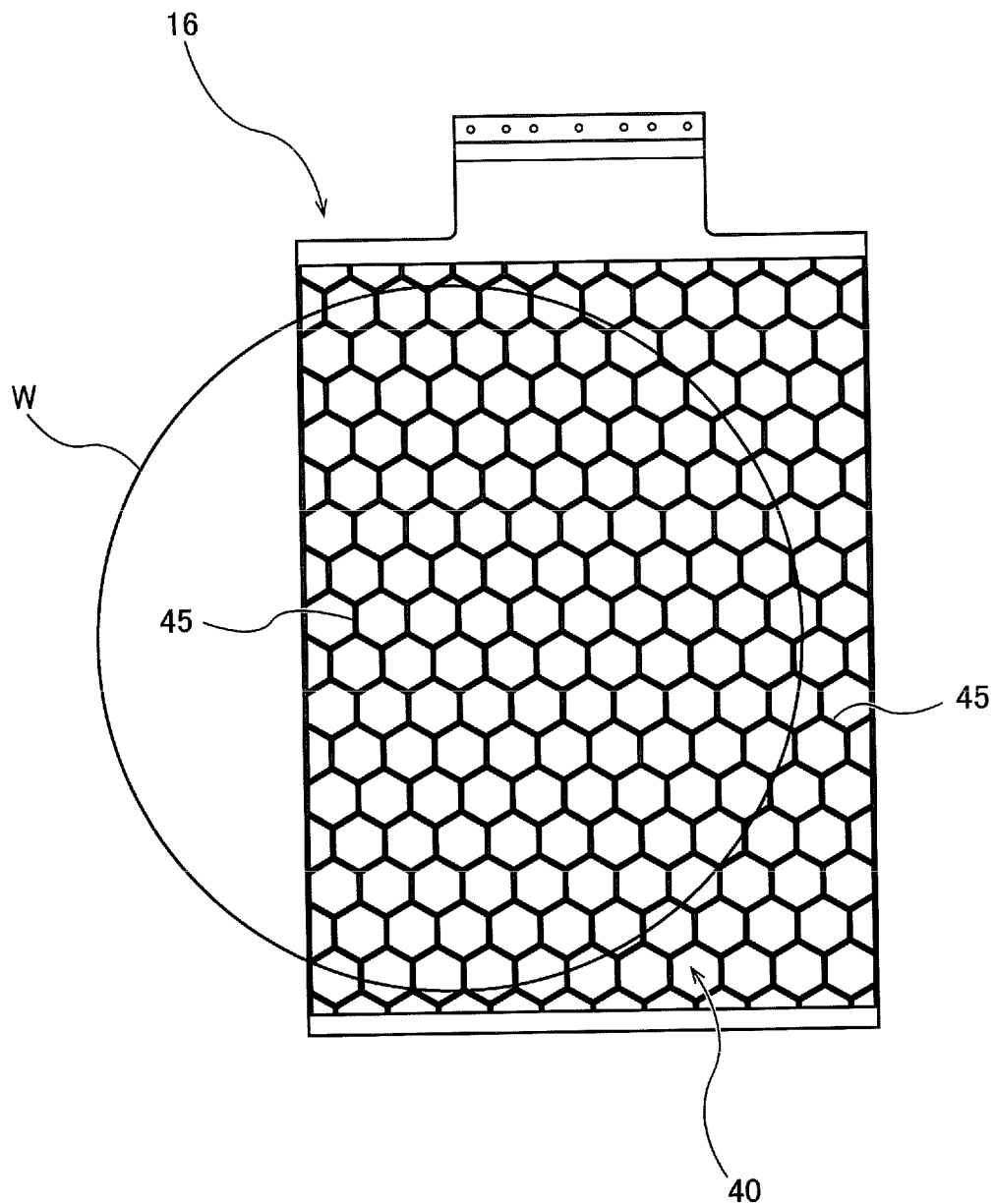
FIG. 5 is a diagram showing the paddle located at a stroke end.

The paddle 16 reciprocates in the horizontal direction as shown by arrows in FIG. 4. A width D1 of the paddle 16 is smaller than a width D2 of the workpiece W. A stroke length of the reciprocating motion of the paddle 16 is larger than a value determined by dividing a difference between the width D2 of the workpiece W and the width D1 of the paddle 16 by 2. As shown in FIG. 5, such stroke length enables the paddle 16 to reciprocate across the entire surface of the workpiece W, and to agitate the plating solution in the vicinity of the entire surface of the workpiece W. FIG. 5 shows the paddle 16 located at the stroke end. However, the present invention is not limited to the present embodiment. In one embodiment, the width D1 of the paddle 16 may be the same as the width D2 of the workpiece W or may be larger than the width D2 of the workpiece W.

Figure 6:
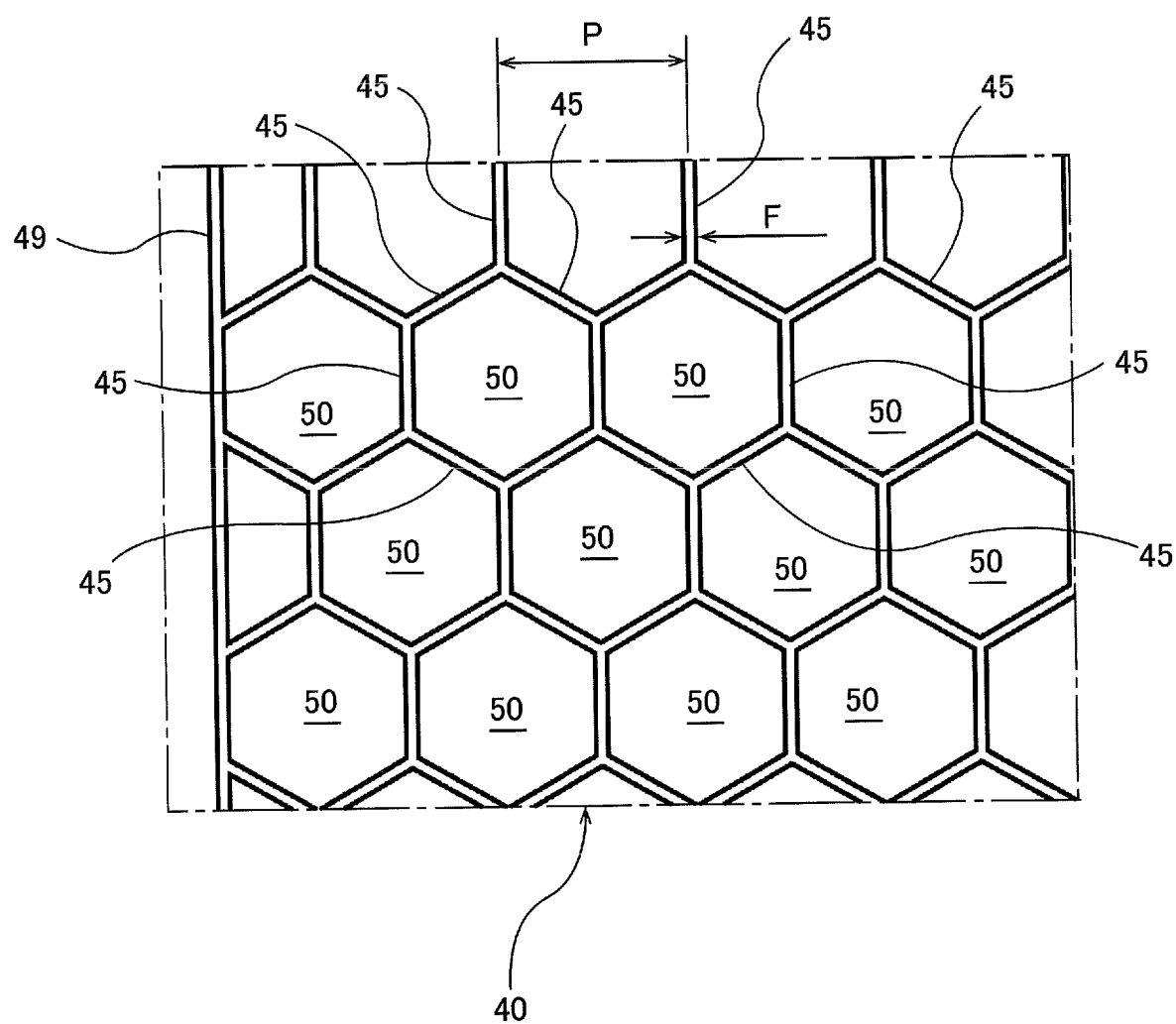
FIG. 6 is an enlarged view of a honeycomb structure.

FIG. 6 is an enlarged view of the honeycomb structure 40. The agitating beams 45 forming the hexagonal through-holes 50 have a predetermined width F. The plurality of hexagonal through-holes 50 are arranged at a predetermined arrangement pitch P without gaps therebetween. Each hexagonal through-hole 50 is a through-hole having a hexagonal cross section. A hexagon is composed of six vertices and six sides connecting adjacent vertices. In the present embodiment, the agitating beams 45 forming one hexagonal through-hole 50 provide six linear sides, but the agitating beams 45 may be slightly wavy or curved as long as the paddle 16 can agitate the plating solution and can secure the mechanical strength thereof. In the present embodiment, the six agitating beams 45 forming the hexagonal through-hole 50 have the same width F, while in one embodiment, one or more of the six agitating beams 45 may have different width(s) than the other agitating beams 45 as long as the mechanical strength of the paddle 16 can be secured.

As shown in FIG. 6, all of the agitating beams 45, forming the hexagonal through-holes 50, are not parallel to the direction of the reciprocating motion of the paddle 16 (the horizontal direction in this embodiment). In other words, each of the agitating beams 45 forming the hexagonal through-holes 50 is inclined obliquely with respect to the direction of the reciprocating motion of the paddle 16 (i.e., the horizontal direction in this embodiment) or perpendicular to the direction of the reciprocating motion of the paddle 16. More specifically, all the agitating beams 45 forming the hexagonal through-holes 50 are inclined at angles larger than 0 degrees and less than 180 degrees with respect to the direction of the reciprocating motion of the paddle 16. Therefore, all six sides of the hexagon, which is the cross-sectional shape of the through-hole 50, are inclined at angles larger than 0 degrees and less than 180 degrees with respect to the direction of the reciprocating motion of the paddle 16.

Figure 19:
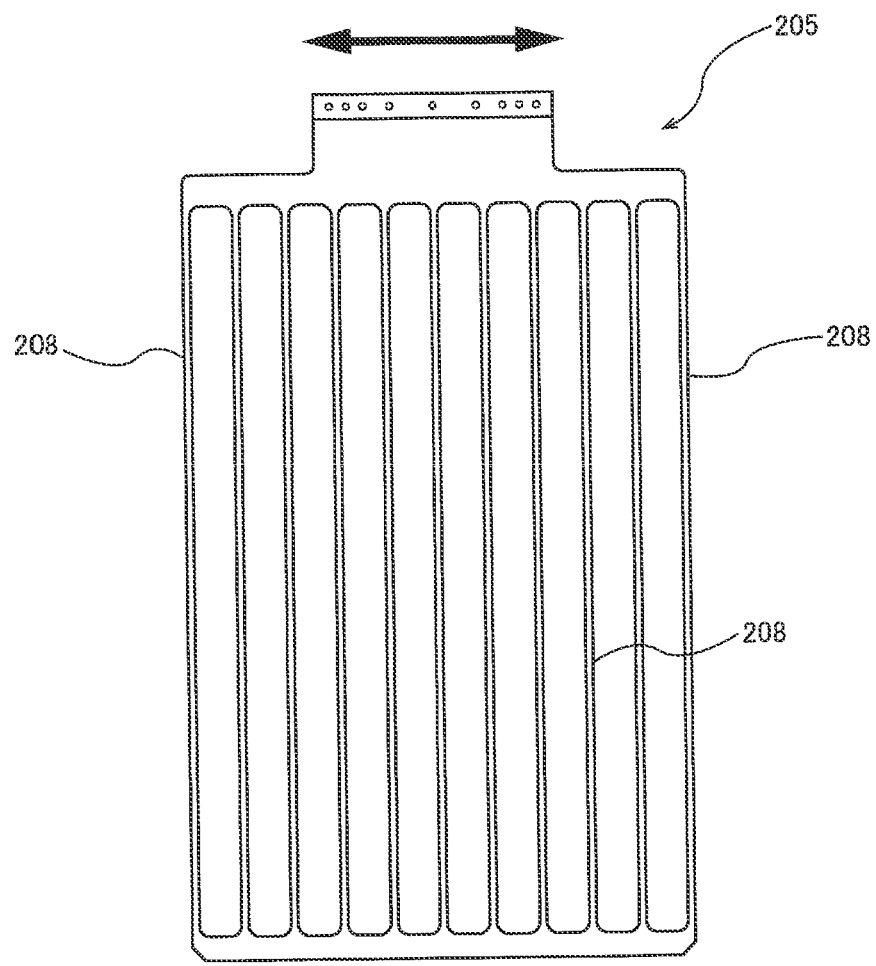
FIG. 19 is a view of a paddle shown in FIG. 18 as viewed from a direction indicated by arrow A.

The paddle 16 having the honeycomb structure 40 can enhance the mechanical strength as compared with the conventional paddle 205 shown in FIG. 19. As a result, the width F of the agitating beams 45 constituting the paddle 16 can be reduced, so that the influence of blocking of the electric field formed between the anode 2 and the workpiece W can be reduced. Furthermore, the weight of the entire paddle 16 can be reduced, and therefore the load applied to the paddle-driving device 29 shown in FIG. 2 is also reduced.

FIG. 7 is a table showing specific configuration examples and performances of the paddle 16 according to the present embodiment and the conventional paddle 205 shown in FIG. 19. Items in the table of FIG. 7 include width of the agitating beams, arrangement pitch of the agitating beams, density of the agitating beams (width/arrangement pitch×100), mechanical strength, and electric-field blocking rate. The width of the agitating beams is a width (see reference symbol F in FIG. 6) of the agitating beams when viewed from the front of the paddle. The arrangement pitch of the agitating beams is an arrangement pitch of the adjacent agitating rods 208 in the paddle 205 of FIG. 19, and the arrangement pitch P of the hexagonal through-holes 50 shown in FIG. 6 in the paddle 16 of the present embodiment. The mechanical strength is an index value of durability against stress generated in the paddle when the paddle reciprocates, and is a relative value obtained by simulation. The electric-field blocking rate is a ratio of a film-thickness reduction amount R2 to a film-thickness reduction reference amount R1 (R2/R1) when the electric field is blocked by the paddle when the paddle is stopped at the stroke end during a certain plating time, wherein the film-thickness reduction reference amount R1 is an amount of film-thickness reduction due to blocking of the electric field when plating of the workpiece is performed using the conventional paddle 205 shown in FIG. 19, and the film-thickness reduction amount R2 is an amount of film-thickness reduction due to blocking of the electric field when plating of the workpiece is performed using the paddle 16 of the present embodiment. The film-thickness reduction reference amount R1 and the film-thickness reduction amount R2 are both obtained by plating simulation.

The conventional paddle described in FIG. 7 is the conventional paddle 205 shown in FIG. 19. Honeycomb paddles No. 1, No. 2, and No. 3 described in FIG. 7 are paddles 16 of the present embodiment. As can be seen from the table shown in FIG. 7, the three types of paddles 16 according to the embodiment have higher mechanical strengths than that of the conventional paddle 205 shown in FIG. 19, and have lower densities of agitating beams 45 (less than 10%). As a result, the three types of paddles 16 according to the embodiment can achieve lower electric-field blocking rates while achieving higher mechanical strengths than the conventional paddle 205 shown in FIG. 19.

Furthermore, since the honeycomb structure 40 can improve the mechanical strength of the paddle 16, the paddle 16 can be made of resin, such as PEEK (polyetheretherketone) or PEI (polyetherimide), in place of titanium (Ti) which has been conventionally used. In one embodiment, the paddle 16 may be made of titanium (Ti). Even in this case, the weight of the entire paddle 16 can be reduced. According to the present embodiment, the weight of the entire paddle 16 can be reduced, so that the load applied to the paddle-driving device 29 shown in FIG. 2 can be reduced.

From the viewpoint of ensuring the mechanical strength of the paddle 16 and lowering the electric-field blocking rate, a lower limit of the width F of the agitating beams 45 is 0.5 mm, and an upper limit of the width F of the agitating beams 45 is 3.0 mm. From the viewpoint of lowering the electric-field blocking rate, the upper limit of the width F of the agitating beam 45 is preferably 1.5 mm. The arrangement pitch P of the hexagonal through-holes 50 forming the honeycomb structure 40 is in a range of 5.0 mm to 23 mm. If the arrangement pitch P exceeds 23 mm, the paddle 16 tends to vibrate when the paddle 16 is reciprocating.

Generally, as the arrangement pitch of the hexagonal through-holes 50 becomes smaller, the number of hexagonal through-holes 50 formed in the paddle 16 increases. As a result, the paddle 16 can agitate the plating solution with more agitation beams 45. However, if the arrangement pitch P is too small, the flow of the plating solution generated within one hexagonal through-hole 50 is likely to collide. Specifically, flows of the plating solution generated by the parallel movement of an upper oblique side and a lower oblique side forming the hexagonal through-hole 50 collide with each other and cancel the agitating effect.

FIG. 8 is a table showing a relationship between the arrangement pitch P of the hexagonal through-holes 50 and agitating intensity of the paddle 16. The agitating intensity is represented by a relative value of an average flow velocity of the plating solution agitated by the reciprocating motion of the paddle 16, and is obtained by fluid simulation under the condition that the width of the agitating beams 45 is limited within a certain range. As shown in the table of FIG. 8, the agitating intensity increases with the decrease in the arrangement pitch of the hexagonal through-holes 50, but reaches its maximum near 8-mm arrangement pitch. When the arrangement pitch of the hexagonal through-holes 50 becomes smaller than 8 mm, the agitating intensity decreases. From the result of this fluid simulation, the arrangement pitch P of the hexagonal through-holes 50 is preferably in a range of 5.0 mm to 13.5 mm, more preferably in a range of 8.0 mm to 13.5 mm. The density (width/arrangement pitch×100) of the hexagonal through-holes 50 is 2% or more and less than 10%. From the viewpoint of ensuring the mechanical strength of the paddle 16 and lowering the electric-field blocking rate, the density of the hexagonal through-holes 50 is preferably in a range of 6% to 8%.

The honeycomb structure 40 of the present embodiment has the plurality of hexagonal through-holes 50 formed by the agitating beams 45. The hexagon is advantageous as compared with a circular shape and other polygonal shapes in that the hexagon can increase the overall mechanical strength of the paddle 16 and can improve the agitating intensity. Under the same area condition, the circle has a shorter circumference than the polygon and has a high strength. However, when multiple circles are arranged on a plane, a contact area between circles is extremely small, and as a result, the mechanical strength of the entire paddle cannot be increased. Triangles can be arranged on a plane without gaps, and a contact area between triangles is large, so that the mechanical strength of the paddle is improved. The same applies to quadrangle.

Figure 9:
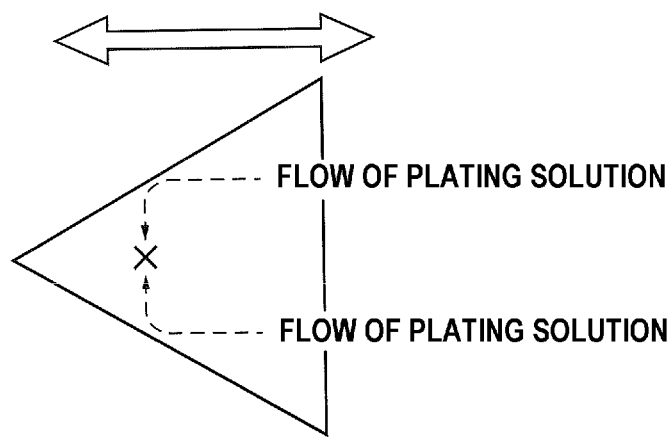
FIG. 9 is a schematic view showing flow of liquid generated by agitating beams forming a triangular through-hole.
Figure 10:
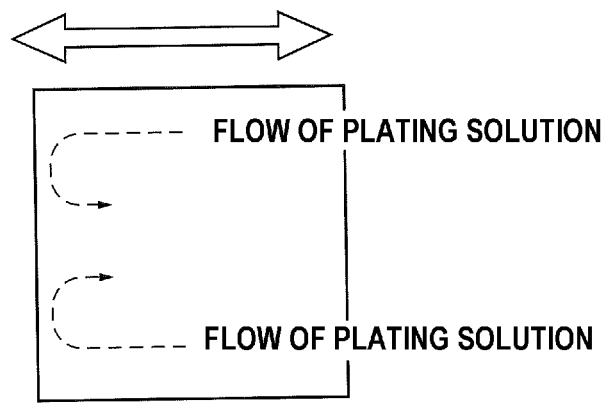
FIG. 10 is a schematic view showing flow of liquid generated by agitating beams forming a quadrangular through-hole.
Figure 11:
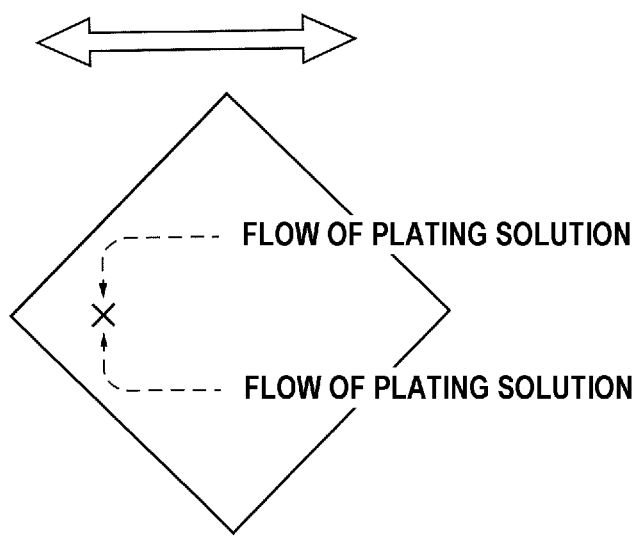
FIG. 11 is a schematic view showing flow of liquid generated by agitating beams forming a quadrangular through-hole.

However, as shown in FIG. 9, the triangle has sides that extend obliquely with respect to the direction of the reciprocating motion of the paddle. Since these sides are connected to each other, flows of the plating solution pushed by these sides collide with each other. As a result, the agitating effect is reduced. As shown in FIG. 10, the quadrangle does not have an oblique side, but has upper and lower sides extending in the direction of the reciprocating motion of the paddle. These sides always block the electric field. As a result, a locally small thickness film may be formed on a workpiece. As shown in FIG. 11, it is possible that sides of the quadrangle may be tilted obliquely with respect to the direction of the reciprocating motion of the paddle. However, in this case, the same problem as the problem described with reference to FIG. 9 occurs. Fluid simulation results have showed that the quadrangle shown in FIG. 11 can achieve only about half the agitating intensity (or average flow velocity) of the honeycomb structure 40 having the hexagonal through-holes 50.

Figure 12:
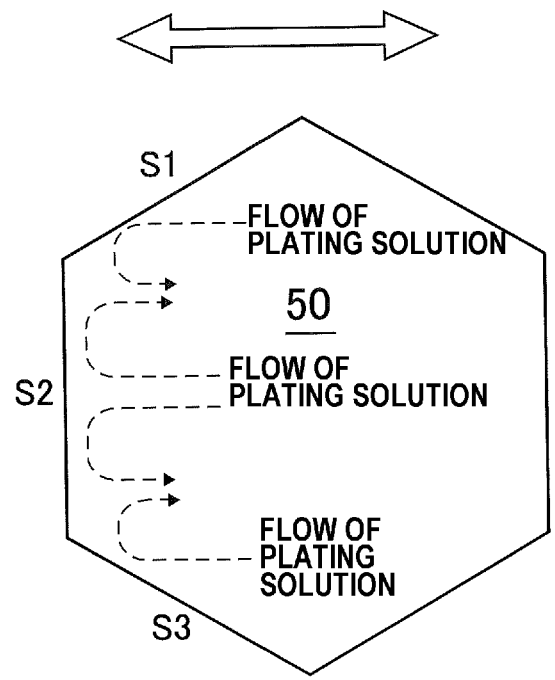
FIG. 12 is a schematic view showing flow of liquid generated by agitating beams forming a hexagonal through-hole.

Hexagon does not have the problems described above. As shown in FIG. 12, the plating solution is pushed by sides S1 and S3 in the oblique directions, but these upper and lower flows do not collide because of the existence of the flow of the plating solution pushed by a side S2 located between the sides S1 and S3. Furthermore, since all the sides forming the hexagon are not parallel to the direction of the reciprocating motion of the paddle 16, the electric field is not always blocked. For these reasons, the paddle 16 having the honeycomb structure 40 with the hexagonal through-holes 50 can achieve improvement of the mechanical strength, reduction in the electric-field blocking rate, and improvement of the agitating intensity.

Figure 13:
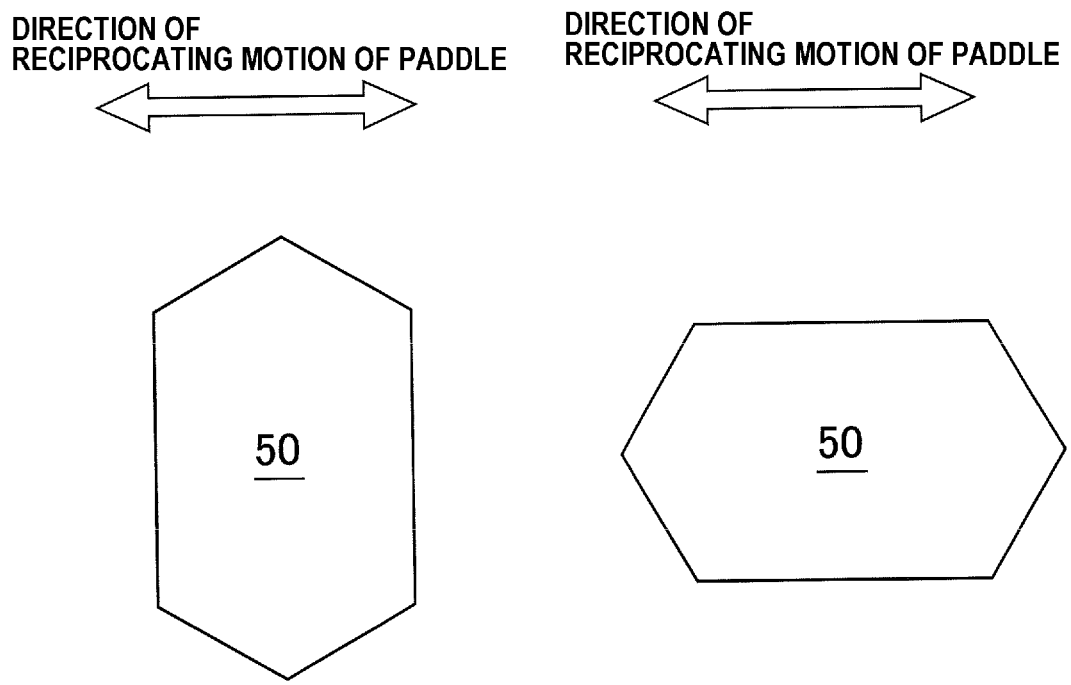
FIG. 13 is a schematic view showing an example of a vertically-elongated hexagonal through-hole and an example of a horizontally-elongated hexagonal through-hole.

Each of the hexagonal through-holes 50 of the present embodiment is a regular hexagonal through-hole having the same length of six sides. In one embodiment, as shown in FIG. 13, the hexagonal through-hole 50 may be a vertically-elongated hexagonal through-hole or a horizontally-elongated hexagonal through-hole.

Figure 14:
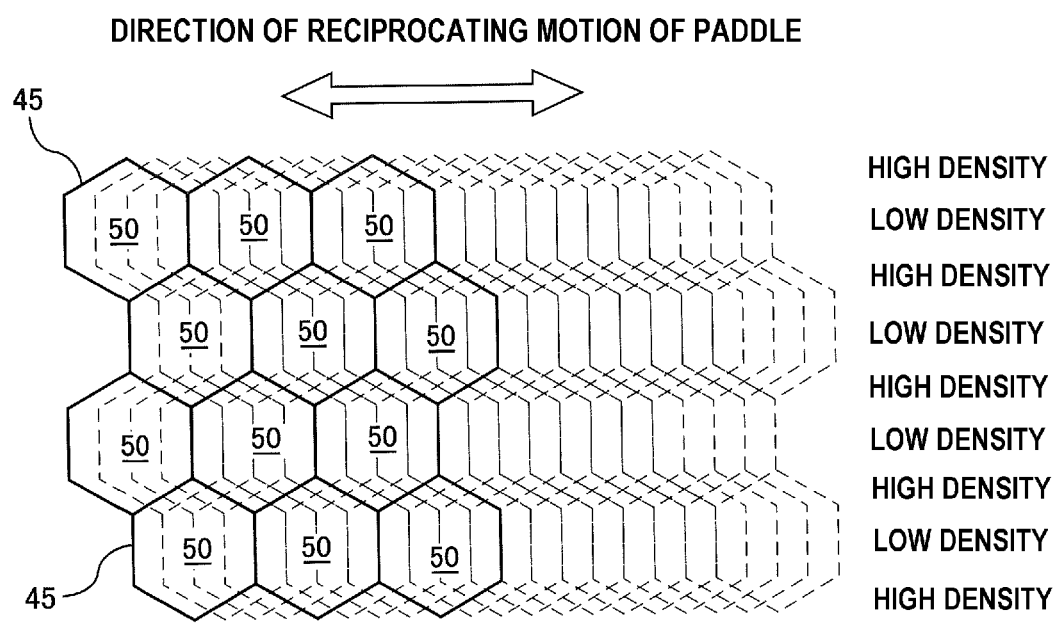
FIG. 14 is a schematic diagram illustrating movement trajectory of hexagonal through-holes when the paddle reciprocates.

FIG. 14 is a schematic diagram illustrating a movement trajectory of the hexagonal through-holes 50 when the paddle 16 reciprocates. In this embodiment, the hexagonal through-holes 50 of the honeycomb structure 40 are arranged parallel to the direction of the reciprocating motion of the paddle 16. With this arrangement, as can be seen from FIG. 14, the density of the agitating beams 45 varies depending on location within the paddle 16, and as a result, both the blocking effect on the electric field and the agitating intensity may become non-uniform.

Figure 15:
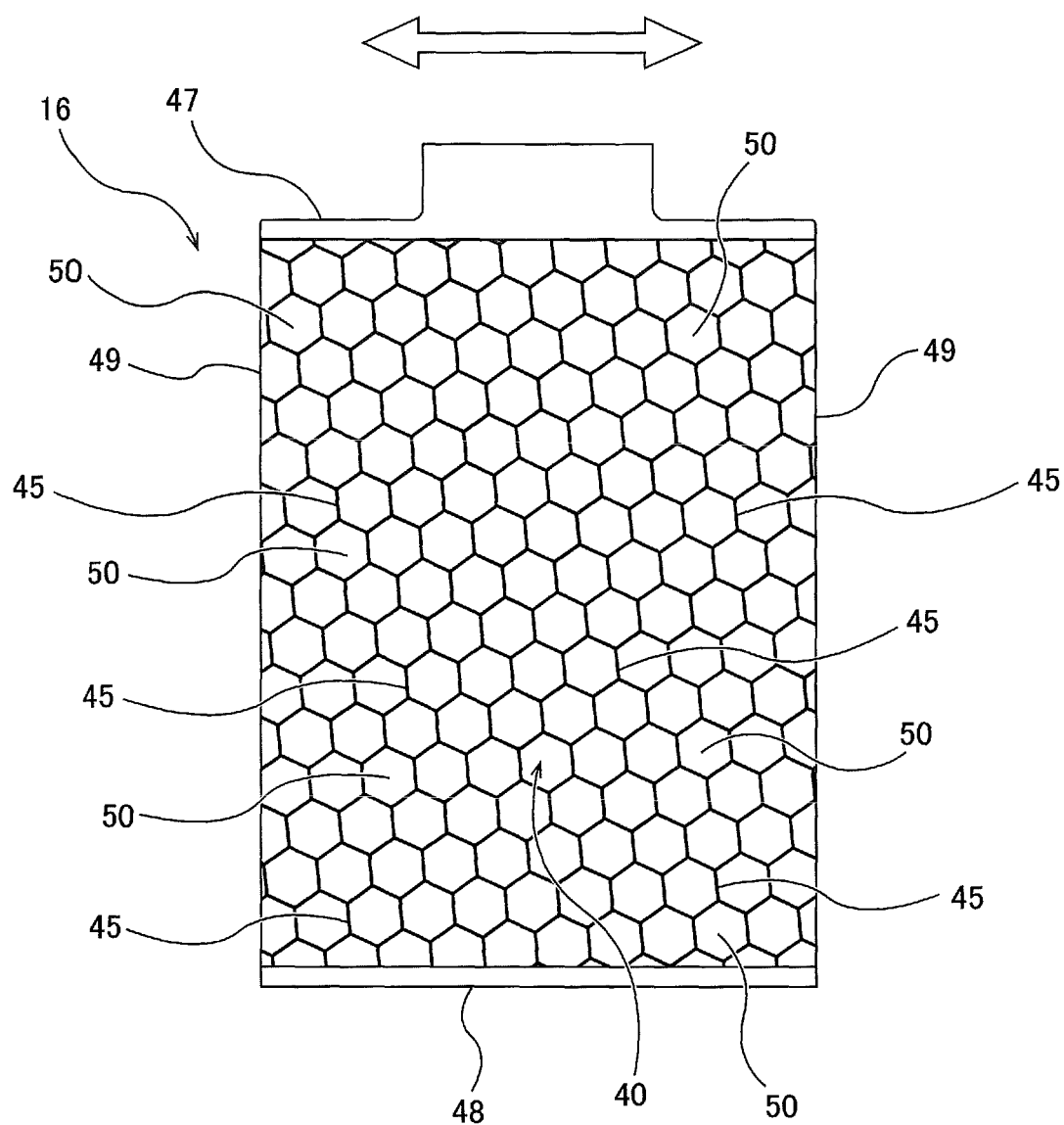
FIG. 15 is a front view showing another embodiment of the paddle.
Figure 16:
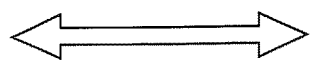
FIG. 16 is a schematic diagram illustrating movement trajectory of hexagonal through-holes when the paddle shown in FIG. 15 reciprocates.
Figure 16:
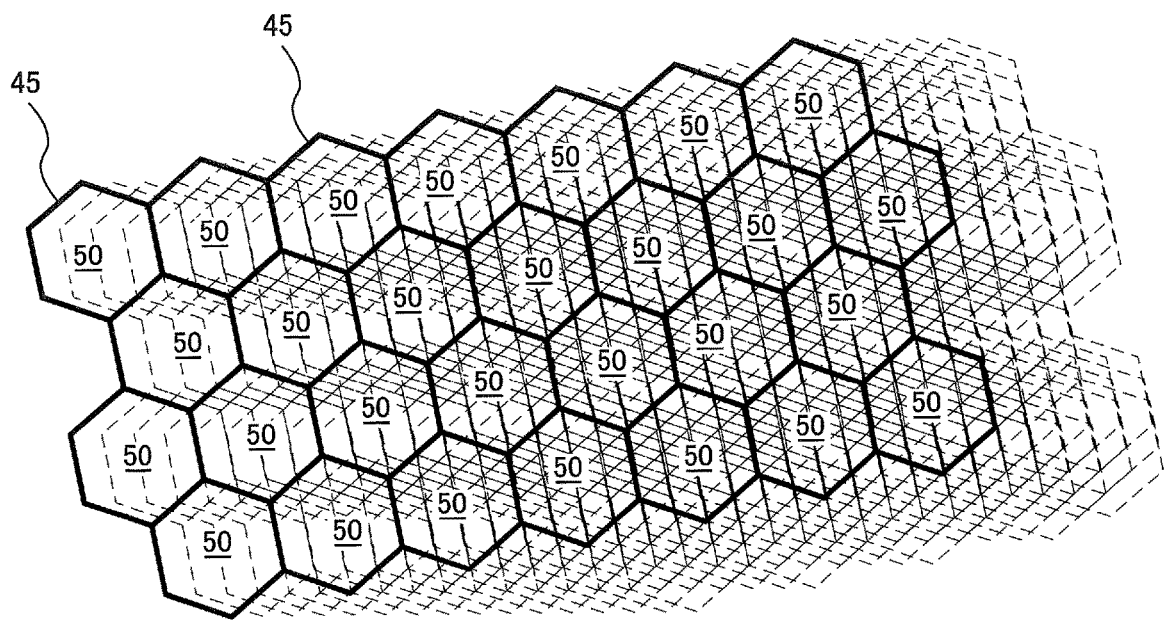
Figure 16:
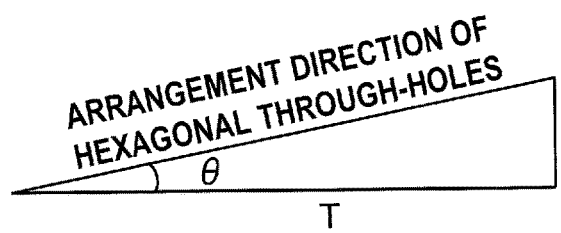
Figure 16:
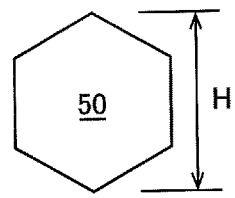

In view of this, in one embodiment, as shown in FIG. 15, the arrangement direction of the hexagonal through-holes 50 may be inclined with respect to the direction of the reciprocating motion of the paddle 16. The structure of the paddle 16 shown in FIG. 15 is the same as that of the paddle 16 shown in FIG. 4 except for the arrangement direction of the hexagonal through-holes 50. FIG. 16 is a schematic view illustrating the movement trajectory of the hexagonal through-holes 50 when the paddle 16 shown in FIG. 15 reciprocates. With the inclined arrangement direction of the hexagonal through-holes 50, the non-uniformity of the density of the agitating beams 45 is improved as shown in FIG. 16. As a result, the non-uniformity of both the blocking effect on the electric field and the agitating intensity of the paddle 16 as a whole is improved.

In the embodiment shown in FIG. 16, the arrangement direction of the hexagonal through-holes 50 is inclined by an angle θ with respect to the direction of the reciprocating motion of the paddle 16. Where T represents a length of one stroke of the reciprocating motion of the paddle 16, H represents a height of the hexagonal through-hole 50, and n represents a natural number, the following equation holds.

$$\tan \theta = n(H/2)/T \tag{1}$$

With the arrangement direction of the hexagonal through-holes 50 inclined at such an angle θ, the non-uniformity of the density of the agitating beams 45 is improved in one reciprocation of the paddle 16. As a result, the non-uniformity of the agitating intensity of the paddle 16 as a whole is improved. On the other hand, if the angle θ becomes large, the side of the hexagon (see S2 in FIG. 12) extending in the vertical direction becomes oblique. As a result, the problem described with reference to FIG. 9 may occur. Therefore, it is desirable that the angle θ be as small as possible. The fluid simulation has shown that the agitating performance of the paddle 16 when n=1 in the above equation (1) is substantially not lowered as compared with the paddle 16 having the horizontal arrangement direction of the hexagonal through-holes 50. Therefore, in the above formula (1), n is preferably 1.

Figure 17:
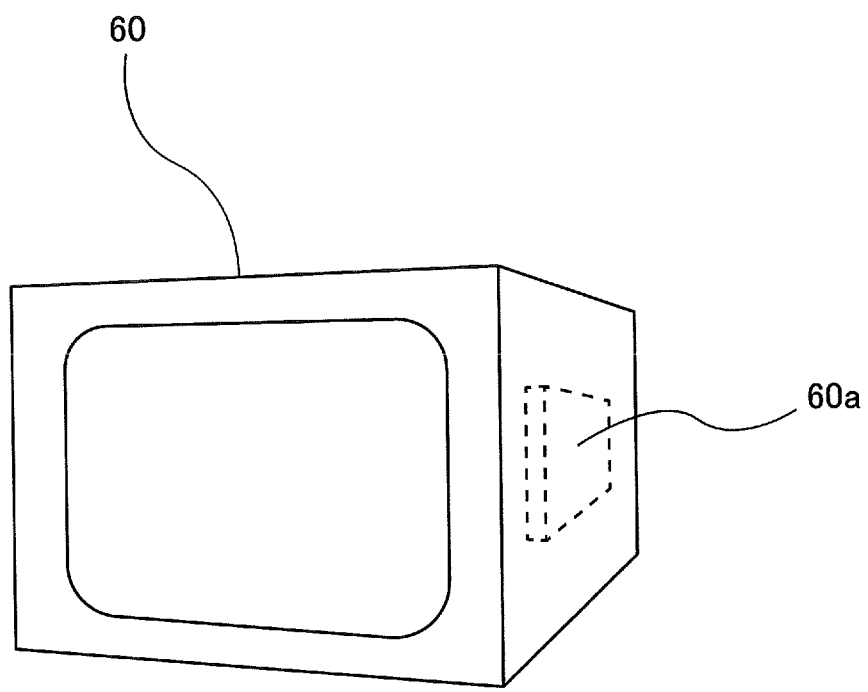
FIG. 17 is a schematic view showing an example of a three-dimensional printing machine.
Figure 18:
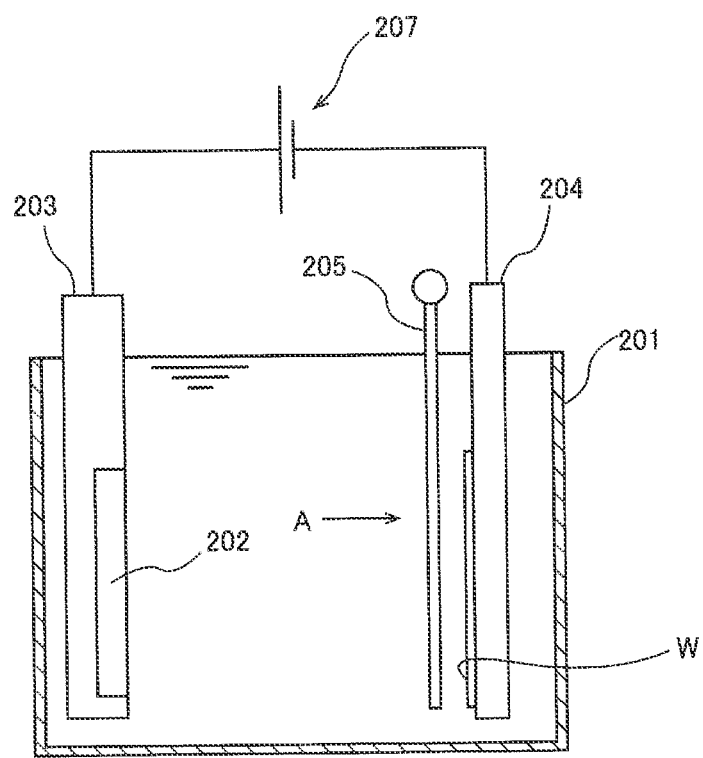
FIG. 18 is a schematic view showing an example of a conventional plating apparatus.

The paddle 16 according to the embodiments described with reference to FIGS. 4 and 15 can be manufactured by a three-dimensional printing machine (which is also referred to as a 3D printer). FIG. 17 is a schematic view showing a three-dimensional printing machine. A three-dimensional printing machine 60 includes a memory 60a, such as a hard disk drive or a solid-state drive. Three-dimensional design data for the paddle 16 is stored in the memory 60a. The three-dimensional printing machine 60 is configured to produce the paddle 16 based on the three-dimensional design data stored in the memory 60a. A known three-dimensional printing machine can be used as the three-dimensional printing machine 60.

In one embodiment, the paddle 16 according to the embodiments described with reference to FIGS. 4 and 15 may be manufactured by a cutting process.

The embodiment shown in FIG. 1 is directed to the plating apparatus in which the workpiece W in a vertical position is immersed in the plating solution held in the plating tank 1, while the type of the plating apparatus is not limited to the embodiment shown in FIG. 1. In one embodiment, a plating apparatus may be of a type (so-called cup type) in which a workpiece in a horizontal or inclined position is immersed in a plating solution in a plating tank.

Furthermore, the paddle 16 of each of the above-described embodiments can be applied not only to the plating apparatus but also to other wet treatment apparatus using a treatment liquid. For example, the paddle 16 of each of the above-described embodiments can be applied to a processing apparatus having a processing tank for holding a processing liquid (for example, a cleaning liquid) used in a pre-treatment or post-treatment for plating. The paddle 16 described above can agitate various processing liquids, such as a cleaning liquid and a plating liquid, to achieve uniform treatment or processing of a workpiece immersed in the processing liquid.

Furthermore, the movement of the paddle 16 is not limited to the reciprocating motion. For example, a paddle-driving device for moving the paddle 16 may be configured to rotate the paddle 16, or move the paddle 16 in a predetermined orbit (e.g., a circular orbit), or cause the paddle 16 to perform a planetary motion. Known techniques may be used for specific configurations of such paddle-driving device for causing these movements of the paddle 16.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A paddle for agitating an electroplating liquid in an electroplating tank, comprising:
   a frame comprising a top portion configured to be reciprocated in the electroplating liquid by a reciprocating mechanism;
   a plurality of agitating beams coupled to the frame, the plurality of agitating beams forming a honeycomb structure, the honeycomb structure having a plurality of hexagonal through-holes formed by the plurality of agitating beams, an arrangement direction of the plurality of hexagonal through-holes being inclined with respect to a longitudinal direction of the frame, wherein the agitating beams of the paddle cause the agitation of the electroplating liquid when moved in the electroplating tank by the reciprocating mechanism.

2. The paddle according to claim 1, wherein each of the plurality of agitating beams is inclined with respect to a direction of movement of the paddle or perpendicular to the direction of movement of the paddle when the frame is moved in the electroplating tank by the reciprocating mechanism.

3. The paddle according to claim 1, wherein the plurality of hexagonal through-holes comprise a plurality of regular hexagonal through-holes.

4. The paddle according to claim 1, wherein a percentage of a width of the plurality of agitating beams to an arrangement pitch of the plurality of hexagonal through-holes is less than 10%.

5. The paddle according to claim 1, wherein a width of the plurality of agitating beams is in a range of 0.5 mm to 3.0 mm.

6. The paddle according to claim 1, wherein an arrangement pitch of the plurality of hexagonal through-holes is in a range of 5 mm to 23 mm.

7. The paddle according to claim 1, wherein the arrangement direction of the plurality of hexagonal through-holes is inclined with respect to a direction of movement of the paddle when the frame is moved in the electroplating tank by the reciprocating mechanism.

8. The paddle according to claim 7, wherein:
the movement of the paddle is a reciprocating motion of the paddle; and
$\tan \theta$ is equal to $n(H/2)/T$, where $\theta$ represents an angle of the arrangement direction of the hexagonal through-holes with respect to the direction of the reciprocating motion of the paddle, T represents a length of one stroke of the reciprocating motion of the paddle, H represents a height of each hexagonal through-hole, and n represents a natural number.

9. The paddle according to claim 1 wherein the agitating beams of the paddle are configured to cause the agitation of the electroplating liquid when the frame is moved in a direction parallel to a face of the frame in the electroplating tank by the reciprocating mechanism.

10. The paddle according to claim 1, wherein the paddle has a rectangular shape, and the frame forms an upper side of the rectangular shape.

11. The paddle according to claim 1, wherein an angle of the arrangement direction of the hexagonal through-holes with respect to the longitudinal direction of the flame is less than 90 degrees.

12. The paddle according to claim 1, wherein the frame extends horizontally.

13. The paddle according to claim 1, wherein:
the movement of the paddle is a reciprocating motion of the paddle; and
$\tan \theta$ is equal to $n(H/2)/T$, where $\theta$ represents an angle of the arrangement direction of the hexagonal through-holes with respect to the longitudinal direction of the flame, T represents a length of one stroke of the reciprocating motion of the paddle, H represents a height of each hexagonal through-hole, and n represents a natural number.

* * * * *